Aug. 31, 1965 W. NAKEN 3,204,120
SWITCHING CIRCUIT
Filed April 5, 1962

WILLIAM NAKEN,
INVENTOR.
BY HIS ATTORNEYS.
Spensley & Horn

United States Patent Office 3,204,120
Patented Aug. 31, 1965

3,204,120

SWITCHING CIRCUIT

William Naken, 1107 S. Burnside, Los Angeles 19, Calif.

Filed Apr. 5, 1962, Ser. No. 185,450
1 Claim. (Cl. 307—88.5)

This invention relates to electrical switching and more particularly to electronic switching circuits.

Electromagnetically actuated mechanical switches have found widespread use in the electronic art. Such switches are commonly actuated by a variation in load current in an amplifier stage. For example, an electromagnetic relay is frequently connected in the plate circuit of a vacuum tube with the resistance of the relay coil providing the proper plate load resistance for the tube, the D.C. plate current of the vacuum tube under no-signal conditions being insufficient to operate the relay. Application of a positive signal voltage to the grid of the tube will cause an increase in the plate current flow of the tube, the increase in current flow through the relay coil causing actuation of the relay and closing of the switch contacts. By packaging such relays in a plug-in type housing the relays may be conveniently and rapidly changed. However, electromechanical switching devices do not provide the stringent reliability required in environments where the devices are subject to extreme shock loading and high G forces, such as in missiles and in aircraft, for example. Also, the switching time of relays, being determined by relay arm inertia, are not rapid enough or constant enough for certain applications. The present invention is directed toward an electronic circuit for direct replacement of electromagnetic types of switches, such as the relays commonly utilized in the plate circuit of a vacuum tube.

Accordingly, it is an object of the present invention to provide improved switching circuits.

It is also an object of the present invention to provide an electronic switching circuit for direct replacement of an electromagnetic switching device.

It is another object of the present invention to provide a switching circuit of the character described, wherein the direct substitution of the switching circuit for an electromagnetic switching device causes no excessive change in power supply current drain.

It is a further object of the present invention to provide a switching circuit of the character described suitable for packaging in a plug-in type housing for direct replacement of a plug-in type relay.

It is yet another object of the present invention to provide a switching circuit of the character described, which is compact, inexpensive and relatively simple to fabricate.

It is a still further object of the present invention to provide a switching circuit of the character described, which switching circuit is characterized by relatively rapid and constant switching times.

It is also an object of the present invention to provide a switching circuit of the character described, which circuit provides reliable operation under environments of extreme shock loading and high G forces.

The objects of the present invention are accomplished by a relatively simple electronic switching circuit which directly replaces an electromagnetic relay to provide a single switching function. A presently preferred embodiment of the switching circuit includes a load resistance of approximately the same resistance as the relay coil which it replaces, thereby permitting direct substitution of the present invention electronic switch without modification of the circuitry into which it is connected. The voltage drop across the load resistance provides the operating potential for the switching circuit, use of the electronic switch causing no excessive increase in power supply drain. In the presently preferred embodiment the voltage appearing across a certain portion of the load resistance is applied to the series combination of a first resistor and a first Zener diode, the constant voltage drop across the Zener diode providing reverse bias for a switching transistor. The voltage appearing across another portion of the load resistance is applied to the series combination of a second resistor and a second Zener diode. The voltage across the second Zener diode under no-signal input conditions is less than its breakdown voltage, and under these conditions the internal resistance of the second Zener diode is very much greater than the resistance of the second resistor. The second resistor is coupled, by means of an isolating resistor, across the first Zener diode. Upon increasing the current flow through the load resistance, the voltage drop across the first Zener diode remains relatively constant in accordance with its negative resistance characteristic. However, the increased voltage drop appearing across the second Zener diode is sufficient to cause it to breakdown and operate in the negative resistance portion of its voltage current characteristic to provide a relatively constant voltage drop for the duration of the increased current flow through the load resistance. Under these conditions, the voltage drop across the second resistor is of the opposite polarity from, and greater than, the voltage drop across the first Zener diode to thereby provide a forward bias to the switching transistor. Hence, immediately upon breakdown of the second Zener diode, the switching transistor will become forward biased and the resulting low output resistance of the transistor will provide the desired switching function.

The novel features which are believed to be characteristic of the invention, both as to its organization and its method of operation, together with further objects and advantages thereof, will be better understood from the following description considered in connection with the accompanying drawings in which several embodiments of the present invention circuitry are illustrated by way of example. It is to be expressly understood, however, that the drawings are for the purpose of illustration and example only, and are not intended as a definition of the limits of the invention.

Figure 1:
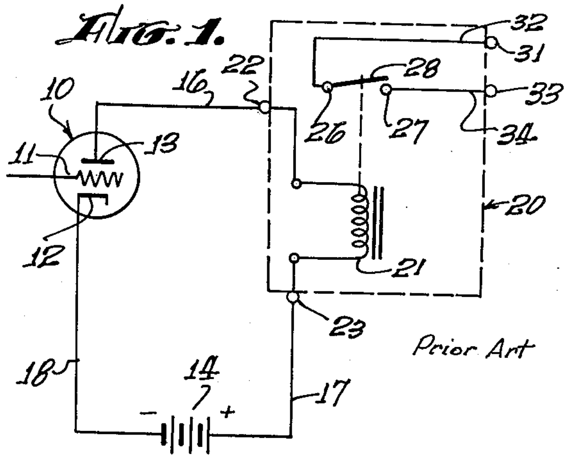
FIGURE 1 is a schematic diagram showing the prior art method of electromagnetic switching through the use of a current relay in the plate circuit of a vacuum tube.

Referring now to the drawing, and specifically FIGURE 1 thereof, there is illustrated a typical prior art electromagnetic switch connected in the plate circuit of a vacuum tube generally indicated by the reference numeral 10. The vacuum tube 10 is of the triode type incorporating a control grid 11, a cathode 12 and a plate 13. A battery 14, coupled between the cathode and plate of the tube 10 provides a source of D.C. operating potential. The grid and cathode of the tube 10 are coupled to suitable circuitry, not shown, for providing grid bias to the tube 10 and for application of positive signal input pulses to the grid of the tube 10. The tube 10 is normally biased so that in the absence of a signal input pulse a predetermined plate current is drawn by the tube, the tube 10 being typically operated as a Class A amplifier. For the purposes of illustration, it will be assumed that the tube 10 will be operated in a D.C. plate current of ten milliamperes with a 2,000 ohm load resistance. The tube will be triggered by application to the grid 11 of a positive rectangular pulse of sufficient magniutde to cause the tube plate current to increase to twenty milliamperes.

A current relay, generally indicated by the reference numeral 20, is coupled in the plate circuit of the vacuum tube 10. The current relay 20 has a 2,000 ohm relay relay coil 21 to provide the desired plate load resistance. The ends of the winding of the relay coil 21 are connected to terminals 22 and 23. The terminal 22 is connected to the plate 13 by an electrical lead 16. The terminal 23 is connected to the positive terminal of the battery 14 by an electrical lead 17, the negative terminal of the battery 14 being connected to the cathode 12 by an electrical lead 18.

The relay 20 is provided with switching terminals 26 and 27 and a relay arm 28, the terminal 26 being connected to the relay arm 28. The relay arm 28 is movable and is electromagnetically coupled to the coil 21, so that when a current on the order of twenty milliamperes passes through the relay coil, the relay arm 28 will be drawn toward the coil core to thereby cause an electrical interconnection between the terminals 26 and 27. The relay terminal 26 is connected to a first output terminal 31 by an electrical lead 32. The relay terminal 27 is connected to a second output terminal 33 by an electrical lead 34. The electrical circuit to be switched is connected to the output terminals 31 and 33, actuation of the relay 20 causing electrical interconnection of the relay terminals 26 and 27 to short-circuit the output terminals 31 and 33. The relay 20 is of the plug-in type, as indicated by the dotted line enclosure, the pins on the relay plugging into the terminals 22, 23, 31 and 33.

Figure 2:
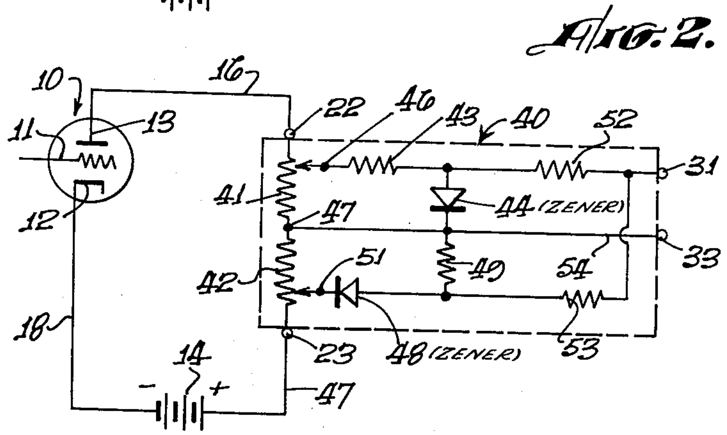
FIGURE 2 is a schematic diagram showing a basic embodiment of the present invention switching circuitry substituted for the current relay of FIGURE 1.
Figure 3:
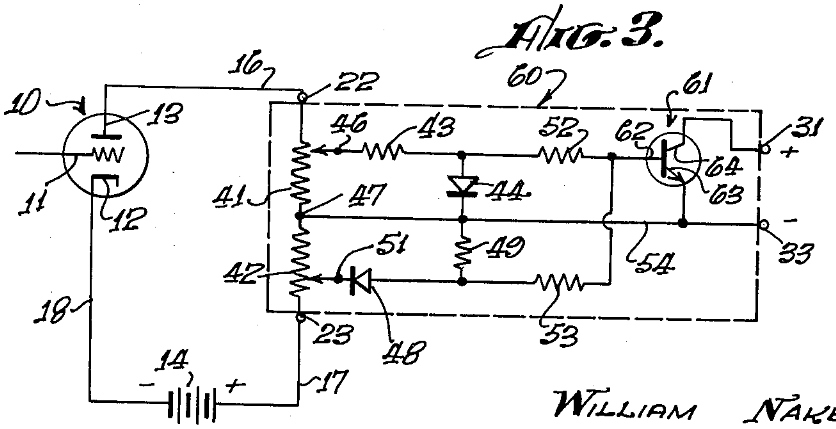
FIGURE 3 is a schematic diagram of another embodiment of the present invention switching circuitry, utilizing a switching transistor.

In operation, with no signal input applied to the grid 11 the ten milliamperes of plate current flowing through the relay coil 21 is insufficient to actuate the relay, and the relay arm 28 will be in the position illustrated in FIGURE 1. Application of a positive input voltage to the gril 11 of the tube 10 will cause an increase in plate current flow. If the relay 20 is a twenty milliampere relay, then the applied signal voltage must be sufficient to cause a plate current flow of twenty milliamperes in order to actuate the relay. Hence, application of a positive voltage of sufficient magnitude to the grid 11 will cause actuation of the relay 20 and movement of the relay arm 28 downward into physical and electrical contact with the relay terminal 27. When the relay arm 28 contacts the relay terminal 27 the output terminals 31 and 33 are short-circuited to thereby provide the desired switching function. The output terminals 31 and 33 will remain short-circuited as long as the grid of the tube 10 is maintained at a potential which enables the flow of sufficient plate current to hold the relay closed. It can thus be said that the switching function is obtained by application to the grid 11 of a positive voltage pulse, the duration of the input pulse determining the switch "on" time. Thus, the input pulse may be formed by the selective application of a D.C. potential or may be a generated pulse, such as a pulse of rectangular waveshape, for example. Thus, when it is desired to close the switch a positive signal input pulse is applied to the grid 11 of the vacuum tube 10, which, in turn, causes an increase in plate current flow and actuation of the relay 20. The switch will remain closed throughout the duration of the positive signal input pulse applied to the grid 11. The rapidity with which the switch may be opened and closed is limited by the inertia of the relay arm 28, by mechanical resonance effects which tend to cause relay chatter, and by the inductive voltage surge resulting when the current through the relay coil is rapidly changed. In accordance with the present invention concepts, the relay 20 is replaced by an electronic switching circuit. FIGURES 2 and 3 of the drawing, wherein like reference numerals identify identical components throughout, show the basic circuit of FIGURE 1 modified by substitution of an electronic switching circuit for the relay of FIGURE 1.

Referring now to FIGURE 2 of the drawing, there is shown an electronic switching device, generally indicated by the reference numeral 40 connected between the terminals 22 and 23 in the plate circuit of the vacuum tube of FIGURE 1. The electronic switching circuit 40 is of the plug-in type and directly replaces the plug-in relay 20 of FIGURE 1, the switching circuit 40 plugging directly into the terminals 22, 23, 31 and 33. In the illustrated embodiment of FIGURE 2, the electronic switching circuit 40 is comprised of six resistors and two Zener diodes. Variable resistors 41 and 42 are series connected between the terminals 22 and 23. The resistors 41 and 42 are selected to have a combined total resistance approximately equal to the plate load resistance of the vacuum tube 10, 2,000 ohms in the illustrated example. The series combination of a fixed resistor 43 and a Zener diode 44 is connected between the variable arm 46 of the resistor 41 and the junction 47 between the resistors 41 and 42. The series combination of a Zener diode 48 and a fixed resistor 49 is connected between the variable arm 51 of the resistor 42 and the junction 47. The junction between the resistor 43 and the Zener diode 44 is connected to the output terminal 31 by an isolating resistor 52. The junction between the Zener diode 48 and the resistor 49 is connected to the output terminal 31 by an isolating resistor 53. The junction 47 is connected to the output terminal 33 by an electrical lead 54.

The resistances of the fixed resistors 52 and 53 are fairly high so as not to unduly shunt the Zener diode 44 and the resistor 49, so that the circuits will provide a load resistance of approximately 2,000 ohms. Under static conditions and with a D.C. plate current of about ten milliamperes a voltage drop of approximately 20 volts will appear between the terminals 22 and 23. The Zener diode 44 is of the type having a breakdown voltage of 3 volts, and the variable arm 46 of the resistor 41 is initially adjusted so that the potential difference between the arm 46 and the junction 47 is greater than 3 volts so that a constant volt drop will appear across the Zener diode 44. The Zener diode 48 is the type having a breakdown voltage of 6 volts, and the variable arm 51 of the resistor 42 is initially adjusted so that the potential difference between the arm 51 and the junction 47 is about 5 volts. Under these conditions the internal resistance of the Zener diode 48 is many times the resistance of the fixed resistor 49, so there will be no significant voltage appearing across the resistor 49. The voltage appearing across the output terminals 31 and 33 will essentially be the three volt drop across the Zener diode 44, with the output terminal 31 then being negative with respect to the output terminal 33.

Upon application of the positive signal pulse to the grid 11 of the vacuum tube 10 the plate current of the vacuum tube will again increase to twenty milliamperes since the tube is still provided with a 2,000 ohm load resistance. Thus, upon triggering of the tube 10 the voltage drop appearing between the terminals 22 and 23 will increase from twenty volts to forty volts. Due to the negative resistance characteristic of the Zener diode 44 the voltage drop across that diode will remain relatively constant at three volts. However, since the voltage appearing between the junction 47 and the variable arm 51 of the resistor 42 is now approximately ten volts, the Zener diode 48 will breakdown and a constant voltage of six volts appears thereacross, the remaining four volts appearing across the fixed resistor 49. The four volt drop appearing across the resistor 49 is oppositely polarized with respect to the three volt drop appearing across the Zener diode 44, so that a resultant of approximately one volt appears between the output terminals 31 and 33. Note, however, that now the output terminal 31 is positive with respect to the output terminal 33, since the positive four volt across the resistor 49 overcame the negative three volt across the Zener diode 44. Thus, in the "off" condition, the output terminal 31 is three volts negative with respect to the output terminal 33, and in the "on" condition the output terminal 31 is one volt positive with respect to the output terminal 33. It is readily apparent that other voltage switching magnitudes may be utilized merely by proper selection of the Zener diodes 44 and 48 and selective adjustment of the variable arms 46 and 51 of the resistors 41 and 42. The breakdown voltage of the Zener diode 44 determines the negative output voltage in the "off" condition, the variable arm 46 being adjusted to provide a voltage slightly in excess of the breakdown voltage so that the Zener diode 44 is continually operated within the negative resistance portion of its voltage-current characteristic. The positive output voltage in the "on" condition is determined by the breakdown voltage of the Zener diode 48 in conjunction with the value of plate current flows under signal input conditions. The Zener diode 48 is selected so that wthen the full load plate current causes an increased voltage drop across the resistor 42 that portion of the voltage drop appearing across the resistor 49 will be a predetermined voltage greater than the breakdown voltage of the Zener diode 44 to provide the desired resultant positive output voltage.

The voltage switching circuit of FIGURE 2 may be converted to a current switching circuit merely by the addition of a switching transistor. FIGURE 3 of the drawing shows the schematic diagram of a current switching embodiment of the present invention based upon the circuitry of FIGURE 2 and with like reference numerals indicating identical components throughout. Again, a switching circuit is plugged into the terminals 22, 23, 31 and 33. In FIGURE 3 the switching circuit is generally identified by the reference numeral 60. The switching circuit 60 is basically the switching circuit 40 of FIGURE 2 to which has been added an NPN switching transistor 61 including a base electrode 62, an emitter electrode 63 and a collector electrode 64. A comparison of the circuit of FIGURES 2 and 3 shows that the switching transistor 61 is interposed between the switching circuit 40 and the output terminals 31 and 33. Thus, the joined ends of the isolating resistors 52 and 53 are connected to the base electrode 62 of the transistor 61. The collector electrode 64 is connected to the output terminal 31, and the emitter electrode 63 is connected to the output terminal 33 and the electrical lead 54. Utilizing the exemplary operating conditions of FIGURE 2, it is seen that in the "off" condition the three volt drop across the Zener diode 44 effectively reverse biases the switching transistor 61 by maintaining the base electrode 62 negative with respect to the emitter electrode 63, in this condition the collector-emitter resistance of the transistor will be extremely high.

As explained hereinabove with respect to the circuit of FIGURE 2, application of a positive switching pulse to the grid 11 vacuum tube 10 results in a four volt drop appearing across the resistor 49, this four volt drop being applied in opposition to the three volt drop appearing across the Zener diode 44 to thereby provide a resultant one volt differential to appear between the electrical lead 54 and the joined end of the isolating resistors 52 and 53. Hence, in the "on" condition, the base electrode 62 of the switching transistor 61 will become one volt positive with respect to its emitter electrode 63, the transistor then becomes forward biased so that its collector-emitter resistance becomes very low. Because of the presence of the switching transistor 61, it is seen that the current flow through the transistor must be in the proper direction in order for the electronic switch to function properly, i.e., the load connected to the output terminals 31 and 33 must be polarized as shown so that the positive terminal of the load is connected to the output terminal 31 and the negative terminal of the load connected to the output terminal 33. The maximum load current that may be safely switched is determined by the current rating of the switching transistor 61. Due to the ready availability of inexpensive, high power switching transistors relatively heavy currents may be easily switched. Since the switching times of transistors are very rapid in comparison to the response time of electro-mechanical relays, a significant advancement has been achieved.

Thus, there has been described both voltage-switching and current-switching embodiments of a novel electronic switching circuit, adaptable for ready replacement of electro-mechanical relays. The switching circuits of the present invention are suitable for direct replacements of current relays while providing approximately the same load resistance as the relay and requiring little additional power for operation. Although the invention has been described with a certain degree of particularity, it is understood that the present disclosure has been made only by way of example and that numerous changes in the circuitry and the combination and arrangement of parts may be resorted to without departing from the spirit and the scope of the invention as hereinafter claimed. For example, althoug the illustrated embodiments of the present invention pertain to replacement of a current relay in the plate circuit of a vacuum tube, the present concepts may be utilized to replace relays in numerous other applications in which there occurs a flow of direct current through load resistance means across which there is applied an electrical switching pulse, as well as being readily adaptable for newly designed circuits. Also, although Zener diodes are presently preferred as the voltage regulating devices, it is apparent that other voltage regulating devices are entirely suitable, such as gaseous discharge tubes or 4-layer diodes, for examples. Furthermore, in the illustrated current switching embodiment of FIGURE 3, by proper choice of voltages and Zener diode characteristics the illustrated NPN switching transistor may be replaced by a PNP transistor.

What is claimed is:

In an electrical amplifier stage including an electrical translating element powered from a source of direct current operating potential: load resistance means coupling said electrical translating element to said source of direct current operating potential; the series combination of a first resistor and a first Zener diode connected across a first predetermined portion of said load resistance, the voltage normally appearing across said first Zener diode being in excess of its breakdown voltage; the series combination of a second resistor and a second Zener diode connected across a second predetermined portion of said load resistance, the voltage normally appearing across said second Zener diode being slightly less than its breakdown voltage; a transistor having an input electrode and output electrode and a common electrode; first and second output terminals, said first output terminal being electrically connected to the output electrode of said transistor and said second output terminal being electrically connected to the common electrode of said transistor; first resistance means electrically coupling said first Zener diode across the input and common electrodes of said transistor to normally reverse bias said transistor; and second resistance means electrically coupling said second resistor across the input and common electrodes of said transistor for selectively overriding the reverse bias voltage from said first Zener diode upon application of a predetermined electrical pulse to said electrical translating element to thereby forward bias said transistor.

References Cited by the Examiner

UNITED STATES PATENTS

| | | | |
|---|---|---|---|
| 2,955,201 | 10/60 | Miller | 328—84 |
| 3,093,789 | 6/63 | Brohaugh | 322—20 |

OTHER REFERENCES

Pub. I—Semiconductors by Stoner et al., CQ, vol. 15, No. 10, October 1959, pps. 62, 63 and 94–96.

ARTHUR GAUSS, *Primary Examiner.*